(12) United States Patent
Yu et al.

(10) Patent No.: US 12,556,264 B2
(45) Date of Patent: Feb. 17, 2026

(54) ON-DEMAND RESOURCE MANAGEMENT SATELLITE COMMUNICATION SYSTEM AND METHOD

(71) Applicant: AST & Science, LLC, Miami, FL (US)

(72) Inventors: Zhi Zhong Yu, Reading (GB); Federico Pedro Fawzi, Midland, TX (US)

(73) Assignee: AST & Science, LLC, Miami, FL (US)

( * ) Notice: Subject to any disclaimer, the term of this patent is extended or adjusted under 35 U.S.C. 154(b) by 478 days.

(21) Appl. No.: 18/142,075

(22) Filed: May 2, 2023

(65) Prior Publication Data

US 2023/0361859 A1 Nov. 9, 2023

Related U.S. Application Data

(60) Provisional application No. 63/339,725, filed on May 9, 2022.

(51) Int. Cl.
*H04B 7/185* (2006.01)
(52) U.S. Cl.
CPC ................. *H04B 7/18513* (2013.01)

(58) Field of Classification Search
CPC .............. H04B 7/18513; H04B 7/0632; H04B 7/18528; H04B 7/18517
See application file for complete search history.

(56) References Cited

U.S. PATENT DOCUMENTS

2018/0102821 A1* 4/2018 Manolakos ........... H04L 5/0023
2018/0115438 A1* 4/2018 Park ..................... H04W 84/12

* cited by examiner

*Primary Examiner* — Fred A Casca
(74) *Attorney, Agent, or Firm* — Botos Churchill IP Law LLP (57) ABSTRACT

Aspects of the technology involve a satellite communication system comprising a base station that communicates with standard compliant user equipment (UE) via a satellite having a field of view. The base station includes a processing device configured to generate a satellite beam at the satellite having a first transmission protocol or a second transmission protocol. The processing device is able to selectively switch between the first transmission protocol and the second transmission protocol based on an actual amount of data traffic by the UE in the field of view or an expected amount of data traffic by the UE in the field of view.

20 Claims, 6 Drawing Sheets

ON-DEMAND RESOURCE MANAGEMENT SATELLITE COMMUNICATION SYSTEM AND METHOD

CROSS-REFERENCE TO RELATED APPLICATIONS

This application claims the benefit of and priority to U.S. Provisional Application No. 63/339,725, filed May 9, 2022, the entire disclosure of which is incorporated by reference herein.

BACKGROUND OF THE RELATED ART

A low-Earth orbit (LEO) satellite constellation provides global coverage including coverage to ordinary mobile phones (UEs in 4G) that are outside the coverage area of terrestrial cell towers (including oceans). One of the limitations of a downlink's beam power from a space-based phased-array is the maximum power of any given antenna element. This implies that the peak-to-average power ratio (PAPR), across antenna elements, must be minimized. Uplink beamforming is not so constrained, i.e., sub-aperture extent and position are unimportant.

U.S. Pat. No. 9,973,266 and U.S. Publication No. 2019/0238216 show a system for assembling a large number of small satellite antenna assemblies in space to form a large array, the entire contents of which are incorporated herein by reference. And U.S. Publication No. 2022/0240151 presents approaches for satellite radio access network beam and gateway seamless handover, the entire contents of which are incorporate by reference herein.

SUMMARY OF THE INVENTION

According to one aspect, a satellite communication system comprises a base station configured to communicate with standard compliant user equipment (UE) via a satellite having a field of view. The base station comprises a processing device configured to cause generation of a satellite beam at the satellite having a first transmission protocol or a second transmission protocol. The processing device is configured to selectively switch between the first transmission protocol and the second transmission protocol based on an actual amount of data traffic by the UE in the field of view or an expected amount of data traffic by the UE in the field of view.

In one example, the first transmission protocol has a high power and high bandwidth and the second transmission protocol has a lower power and a lower bandwidth than the first transmission protocol. Alternatively or additionally, the processing device is configured to provide on-demand resource allocation to provide sufficient bandwidth and power on-demand to UE(s) in the field of view. Alternatively or additionally, the first transmission protocol may be Global System for Mobile Communications (GSM) and the second transmission protocol may be Long-Term Evolution (LTE).

For any of the above configurations, the processing device may select the first transmission protocol when no UE is active in the field of view, and may select the second transmission protocol when a UE is active in the field of view. Alternatively or additionally, the first transmission protocol may comprise Time Division Multiple Access (TDMA) and Single Carrier Per Channel (SCPC). In an example, the TDMA may be at approximately 52 kb/s and SCPC may be at approximately 200 Mb/s (such as +/−10%, or more or less).

For any of the above configurations, the processing device may selectively choose, for the second protocol, between a first transmission speed and a second transmission speed. In one example, the second transmission protocol may comprise LTE, the first transmission speed may be on the order of 5 MHz, and the second transmission speed may be on the order of 10 MHz (such as +/−10%, or more or less).

The expected amount of traffic may be pre-stored at the processing device. The UE may comprise a wireless device. By way of example, the UE may comprise a cellular phone. For any of the above configurations, the satellite may communicate directly with the UE and not via the base station.

DETAILED DESCRIPTION OF THE INVENTION

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Figure 1:
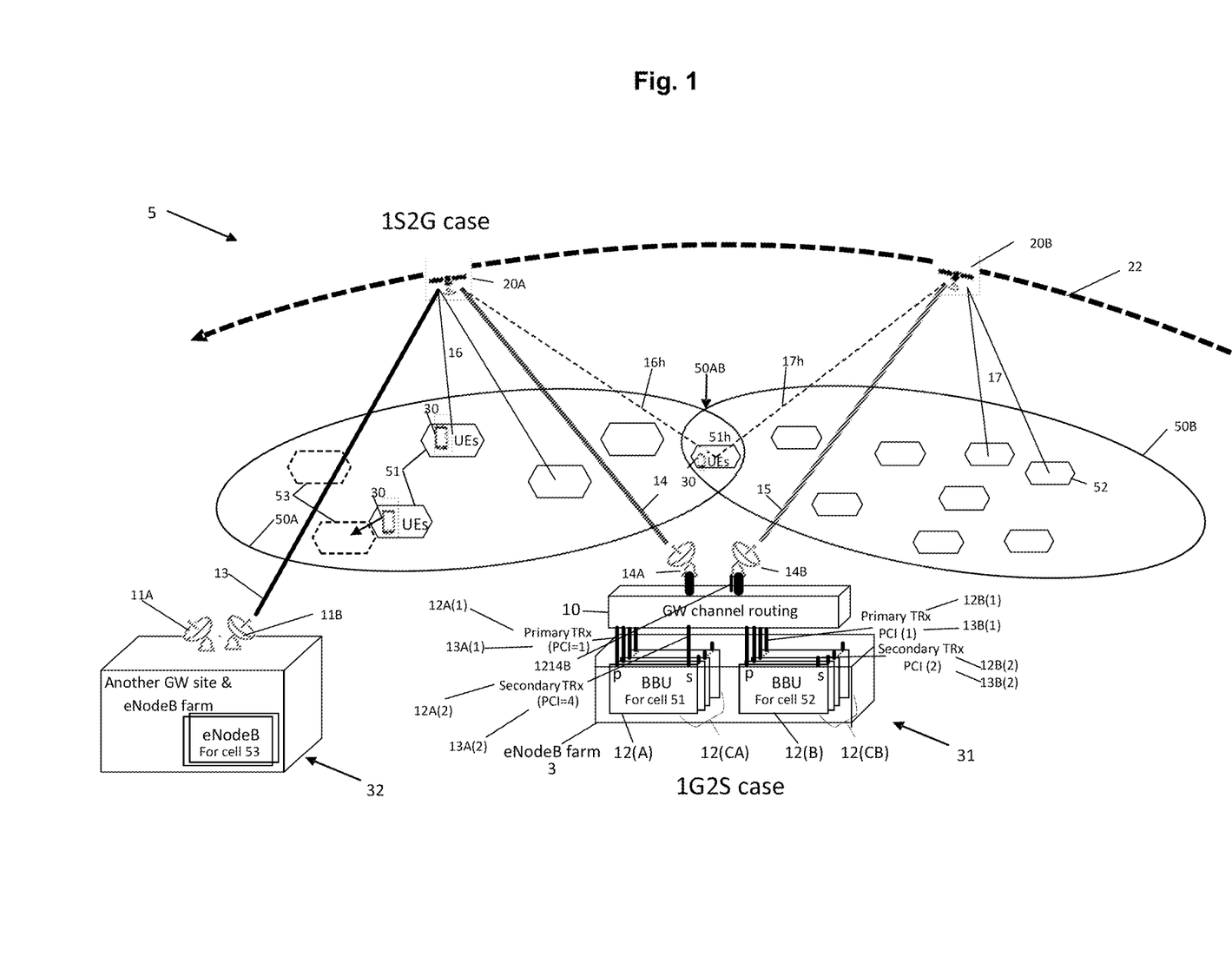
FIG. 1 illustrates a satellite and ground station communication system in accordance with aspects of the technology.

Referring to the drawings, FIG. 1 shows a satellite communication system 5 having a satellite 20 and a gateway site or ground station 31 in accordance with one embodiment of the present disclosure. The gateway site 31 includes a gateway channel routing block 10 that provides the appropriate channels signal for corresponding to two antennas 14A and 14B, which are directional antennas tracking the satellites, and a plurality of eNodeBs, like 12(A) and 12(B) for every geographical cell. The gateway site 31 is in communication with User Equipment (UEs) via a setting satellite 20A and a rising satellite 20B. The satellite devices 100, here labeled as satellites 20A, 20B, communicate with the UEs over a respective setting TRx beams 16 and rising TRx beams 17. FIG. 1 illustrates both the 1G2S (1 serving gateway site (GWS) that links with 2 neighbor Satellites simultaneously) case, highlighting one of the cells in 2 satellites footprint overlapping area going through beam handover; and 1S2G (1 Satellite that has RF links with 2 GWS simultaneously) case for gateway handover.

UEs can be in an idle state and those UEs would only monitor the cells and carry out cell reselection and tracking area update when needed (e.g., for paging), there is no need for the eNodeBs to take care of them in beam handover (BHO). The BHO takes care of the active UEs only. The active UEs are or include the UEs in a call, and need eNodeB dedicated control to move from setting satellite beam to the rising satellite beam. The gateway channel routing block 10 manages the required channels for satellites 20A, 20B, so that they provide the scheduled services to the cells 53 intended dynamically. All the channels/cells signal served by a satellite are packed together and passed between GW and satellite via feeder link (different from the MNO's LTE spectrum) beams 14 and 15, while each cell 53 being served by the satellite uses MNO's spectrum via electronic steerable beams. The gateway site 32 includes gateway antennas 11A, 11B, with respect to their serving eNodeBs (such as Base Band Units (BBUs) for cells 53). The feeder link beams 14 and 15 may, for example, have a wide bandwidth with frequency of 40-50 GHz. And the service link beams are controlled by a Network Mobile Operator (NMO).

FIG. 1 further shows the satellites 20A, 20B's RAN (radio access network, e.g., GSM, LTE and 5G NR) signal footprints or field of Views (FoV) 50A, 50B on the Earth surface. The setting satellite 20A has a setting satellite FoV 50A, and the rising satellite 20B has a rising satellite FoV 50B. The setting and rising FoVs 50A and 50B, in which the satellites communicate with UEs directly in their cells with serving beams on downlink (DL) and uplink (UL). The setting and rising FoVs 50A and 50B overlap (or at least partially overlap) in the overlapping area 50AB. In accordance with one embodiment, BHO occurs for the cells 51*h* located inside the overlapping FoV area 50AB.

The ground cells 53 are served by the two satellites 20A, 20B, which are linked to the gateway channel routing block 10, via gateway antennas 14A, 14B that interface with the respective processing devices (i.e., eNodeBs) 12 serving those ground cells. The processing devices 12 control communication with the UEs via the satellites 20, 20A, 20B. In particular, FIG. 1 illustrates one embodiment of a system, including a 1G2S (1 Gateway that links with 2 Satellite) mobile communication system 5, though other configurations can also be handled, though other configurations can be provided. As shown, the satellite communication system 5 includes a base or ground station 31, which contains a farm (such as an eNodeB farm) 3 and GW channel routing block 10 that communicate over two satellites 20A, 20B, and multiple UEs 30 in a beam HO cell 51*h* in the satellite overlapping area 50AB (here, overlapping ground cells are labelled 51*h* and non-overlapping cells are labelled 51, 52. The cells 51 will change to cells 52 as the satellites orbit around the earth on path 22). In certain examples, a gateway may include gateway antennas 14A, 14B and the gateway channel routing block 10.

In some examples, the ground station 31 has many base station BBUs, e.g., eNB farm and minimum of two directional antennas 14A, 14B via a gateway-satellite feeder link 14, 15 respectively carrying the BTS/LTE/5G downlink (DL) and uplink (UL) signals for their footprints 50A, 50B. The drawing highlights one of the HO cells 51*h* in the overlapping area 50AB, to illustrate where BHO happens. One or more UEs are in the BHO cells 51*h*. The processing device 12 can be, for example, a server or computer such as RAN base station forms, such as BTS for GSM, eNodeB for LTE and gNodeB for 5G, which transmit (Tx) and receive (Rx) LTE signals and can communicate with a GWS device that is located at the ground station. The satellites 20A 20B are in communication with the ground station antennas 14A, 14B. The first satellite 20A is setting, i.e., leaving the current footprint 50A for the ground station antenna 14A, and the second satellite 20B is rising or ascending, serving the footprint 50B for the ground station antenna 14B.

Figure 2A:
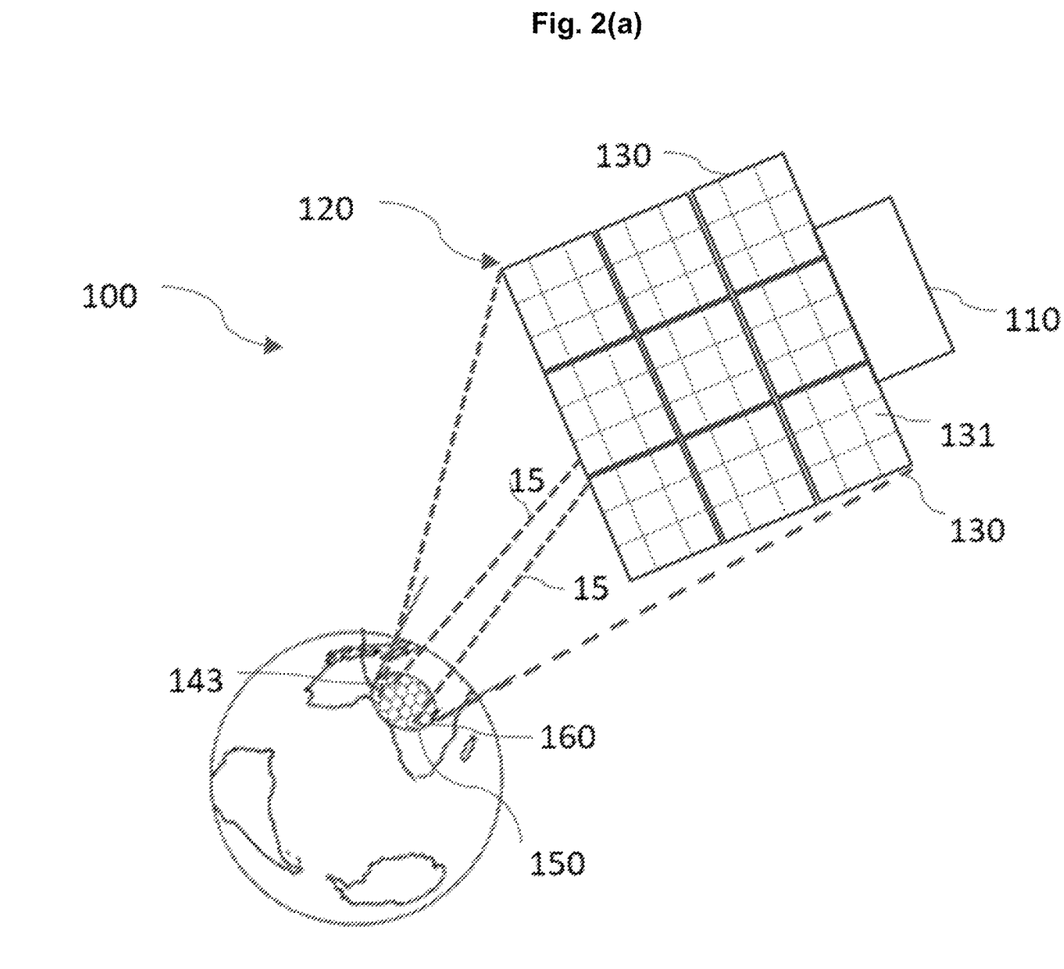
FIGS. 2(a)-(b) illustrate communication via a satellite phased antenna array in accordance with aspects of the technology.

FIG. 2(*a*) illustrates the satellite devices 100 (element 20 in FIG. 1) according to one example embodiment of the present disclosure. The satellite devices 100 includes a control satellite 110 and a satellite phased antenna array 120. The phased array 120 includes a plurality of small satellites or antenna assemblies 130, which can also be referred to as "microns." An antenna assembly 130 can include an array of (or a plurality of) antenna elements 131.

The microns 130 communicate with end users within a footprint 150 on Earth, and also communicate with the control satellite 110. The control satellite 110 communicates with the microns 130 and with a gateway at a base station on Earth. The control satellite 110 and/or the microns 130 can also communicate with user equipment on Earth.

The satellite phased array 120 has a field of view (FoV) 150, and has a plurality of service beams 10 and a plurality of cells 160 (element 53 in FIG. 1) in the field of view (FoV) 150. A service beam 10 is between a cell 160 and the satellite phased array 120, and thus, corresponds to the cell 160. The service beam 10 can have an uplink beam and downlink beam. Signals transmitted via service beams 10 can include uplink signals from a wireless device (such as mobile user equipment) in a cell to the satellite phased array 120, and downlink signals from the satellite phased array 120 to a wireless device in a cell.

The ground station processing device 12 (e.g., the eNodeB), can be configured to control operation of the satellite communication system 5, including communication between the satellite 100 and the UEs and communication between the satellite 100 and the ground station 31. In particular, the eNodeB 12 can dynamically configure the RAN for the satellite 100 to provide on-demand resource allocation, for example, bandwidth and/or power allocation. As the satellite 100 orbits the Earth, beam handover is conducted periodically, for example every 1-10 minutes, and typically about every 5 minutes. As noted, handover need not be provided for inactive user equipment.

In one example embodiment of the disclosure, the satellite communication system 5 includes a Network Control Center (NCC). The NCC can be provided, for example, at the base station 31, and can include a database. The NCC database is accessed by the BBU and stores available resource data for all resources, including for example power and bandwidth. For example, the resource data can indicate how much data is being used for all cells. The BBU (e.g., eNodeB 12) is in communication with the NCC database and can access the NCC database to provide resource allocation based on demand statistics stored at the NCC database. The eNodeB can periodically access the NCC database, or the NCC can periodically send a demand statistics report to the eNodeB 12 via, for example, a control channel. The eNodeB 12 can then determine, for example, the appropriate operating parameters for communications between the satellite 100 and the UE, as well as communications between the ground station and the satellite 100, including for example RAN, bandwidth, power, MIMO, number of BBU.

As the satellite 100 orbits the Earth, the ground station eNodeB 12 can be programmed to know the expected capacity of the cells 160 within its field of view 150, and dynamically switch between TDMA and SCPC to provide sufficient bandwidth to handle the needed resources on demand. For example, the eNodeB 12 can know the flight of a plane or a boat cruise and determine if the plane or boat will be in the orbit of a satellite 100 at a given time, and allocate sufficient resources based on those known resource demands. That data can be stored, for example, at the NCC database. In addition, the ground station eNodeB 12 can dynamically switch between the LTE communicating at 5 MHz and 10 MHz, on-demand, i.e., as needed to handle communications with the user equipment.

Figure 2B:
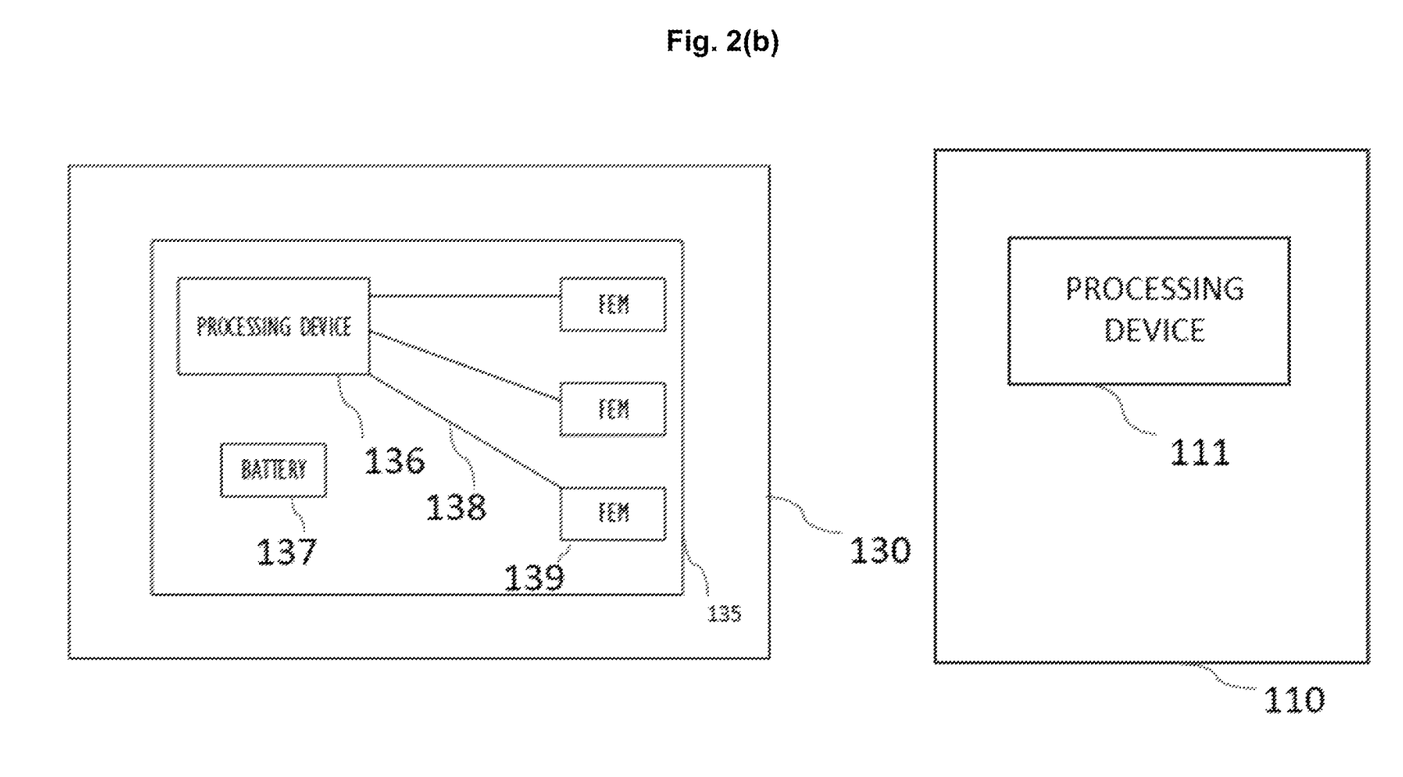

FIG. 2(b) illustrates a block diagram of an example of a micron 130 of the phased antenna array 120, and a control satellite 110. The phased antenna array 120 include a plurality of microns 130. The micron 130 includes a component assembly 135, and other suitable parts such as antennas of antenna elements 131 (FIG. 2(a)). The component assembly 135 can include, for example, one or more processing devices 136, a battery 137, wires or cables 138, and Front-End Modules (FEMs) 139. As further shown in FIG. 2(b), the control satellite 110 can include one or more processing devices 111 (such as a central controller or a central processing unit) configured to communicate with the phased antenna array 120, and/or control operation of the phased antenna array 120.

Uplink (UL, which denotes communications from UEs to satellites) and downlink (DL, which denotes communications from satellites to UEs) are considered separately, as the objectives are different in the two cases. Uplink signals attempts to minimize or reduce interference (from other than the target UEs in the FOV) to a satellite beam that covers the targeted cell (e.g., akin to a 48 km cell in low-band LTE). DL signals attempt to minimize or reduce interference (to UEs) to terrestrially covered cells and inter-beam interference, while minimizing or reducing the peak-to-average-power (PAPR) in the elements of the phased array antenna (by sub-aperture selection).

Downlink signal transmissions can be sent in accordance with any of multiple transmission schemes or protocols. For example, a first transmission protocol can be a LTE (Long-Term Evolution) transmission protocol and a second transmission protocol can be a GSM (Global System for Mobile Communications) transmission protocol. LTE is a high-power, large bandwidth transmission scheme at 10 MHz, or 5 MHz in some instances, but a more limited coverage area than GSM. GSM is a low-power, small bandwidth transmission scheme at 200 kHz, and has a wider coverage area than LTE.

Figure 3A:
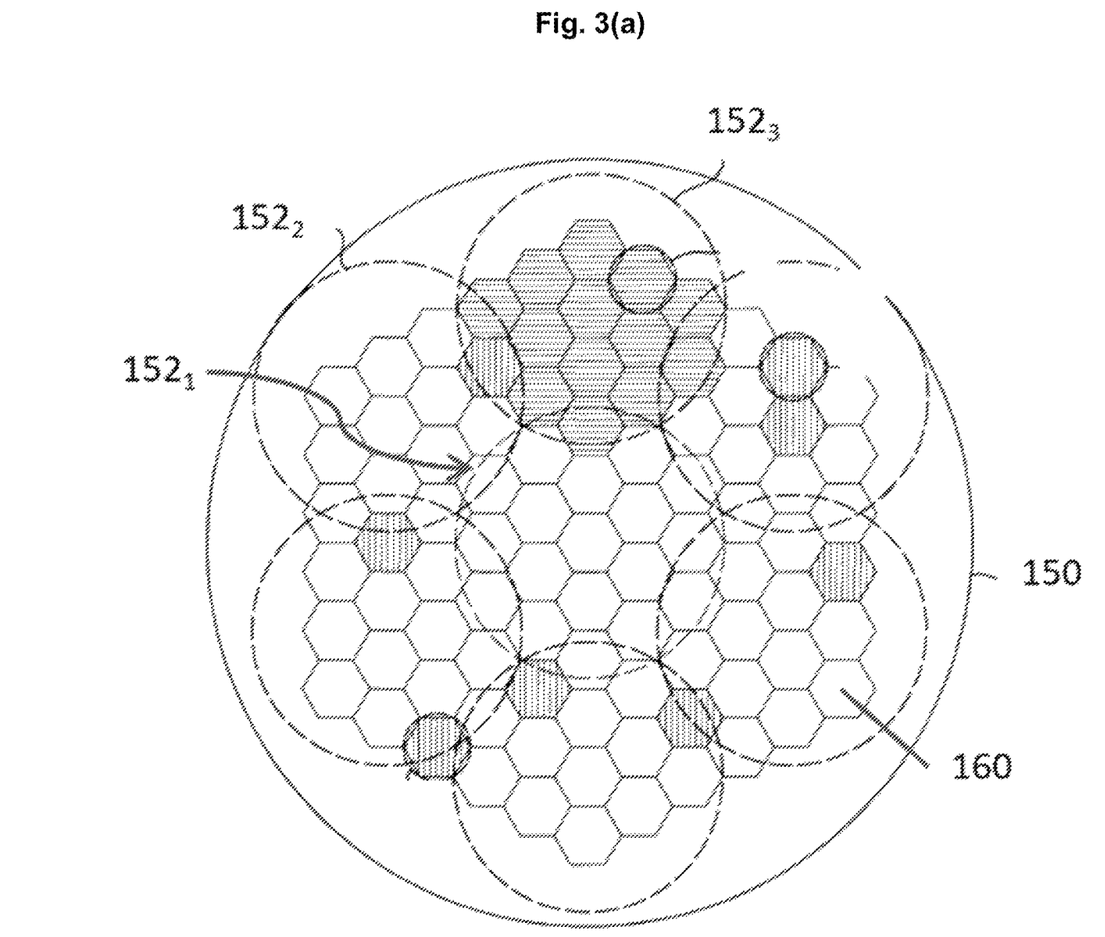
FIGS. 3(a)-(c) illustrate satellite field of view and cell coverage in accordance with aspects of the technology.
Figure 3B:
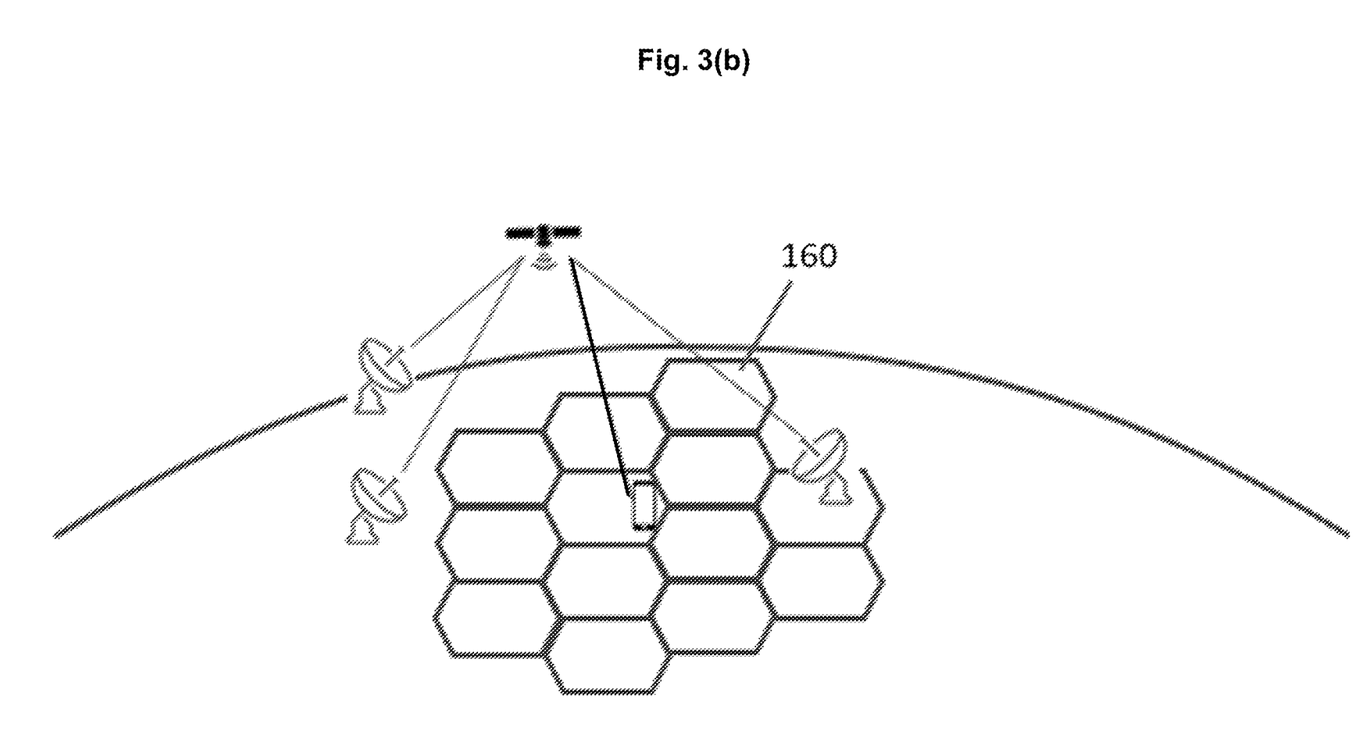

FIG. 3(a) shows an example of the field of view 150 for the satellite array 120. The field of view 150 may be in communication with one or more beams $152_1$, $152_2$, $152_3$. Each beam $152_1$, $152_2$, $152_3$ can communicate with a plurality of cells 160. As further shown in FIG. 3(c), the cells 160 within a particular beam 152 are arranged in layers. A first cell cluster or first cell layer is at the center of the beam 152 and includes a single first cluster cell 1601. A second cell cluster or second cell layer surrounds the first cell cluster, and here the second cell cluster has six second cluster cells 1602 that completely surround the first layer cell 1601. A third cell cluster or third cell layer surrounds the second cell cluster, and here the second cell cluster has twelve third cluster cells 1603 that complete surround the second cluster and the second cluster cells 1602. Thus, the clusters are arranged concentrically about one another, with the third cell cluster completely surrounding the second cell cluster, and the second cell cluster completely surrounding the first cell cluster. Though the cells are shown as hexagonal shapes, they can be circular in shape or any other suitable shape.

Figure 3C:
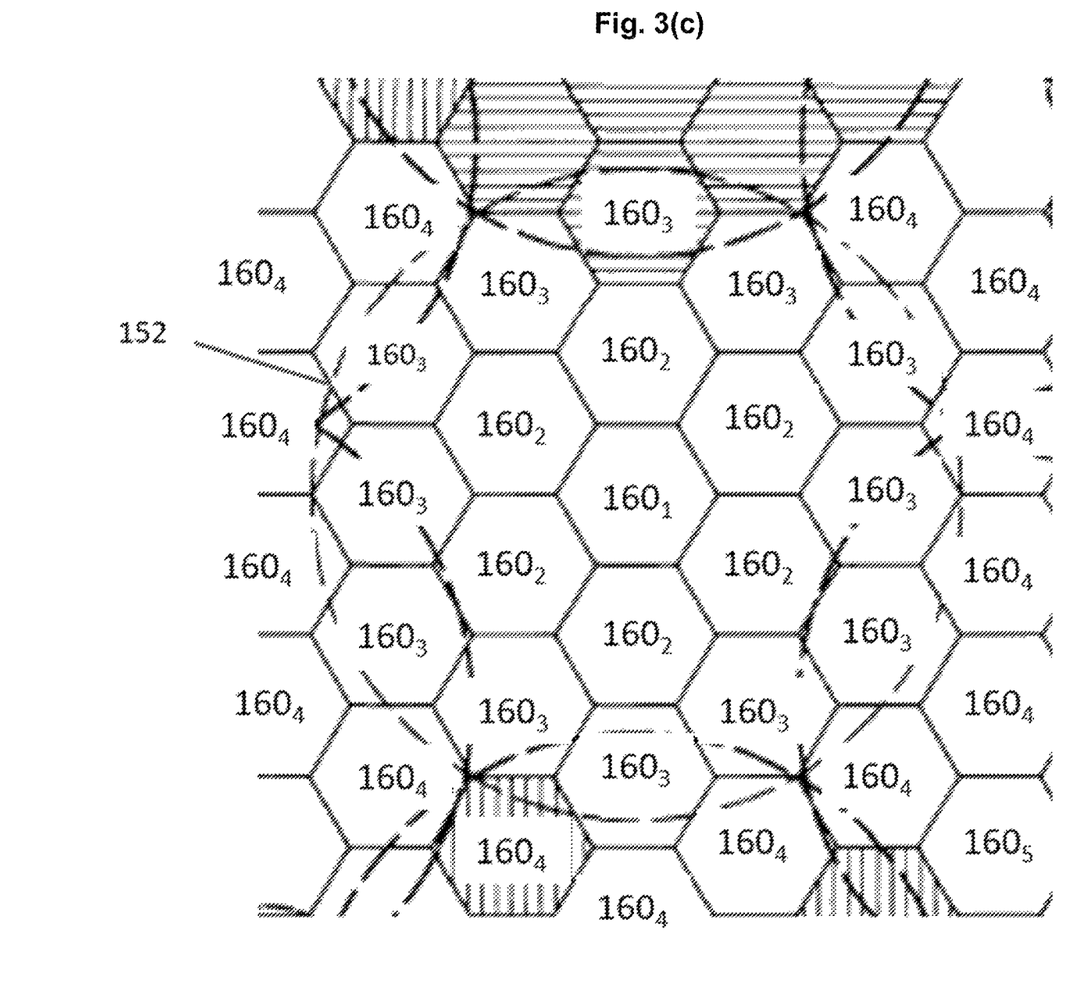

In operation according to one scenario, the eNodeB 12 controls the satellite 100 so that the beams 152 use the lower-power GSM transmission schemes to detect an active user equipment within one of the cells 160. The control channel indicates whether user equipment is active. Once a threshold level of communication is met, the beam 152 switches to the high-power LTE transmission scheme to directly communicate with the active user equipment. The threshold level can be, for example, a number of user equipment (one or more) that are active within the cell, or a certain amount of data communication. In addition, when the beam 152 is in the high-power LTE transmission scheme, it determines if the threshold level of communication is no longer met in a given cell 160 (for example when one or more of the active UEs have completed its communication and the UE becomes inactive), the system 5 can switch from LTE transmissions to GSM transmissions. In this manner, the low-power GSM signal can be used to more widely cover the outer cells, here the third cluster cells 1603, and a wider low-power beam 152 can be utilized to cover a large area where there are few user equipment such as a desert or ocean.

In addition, the transmission scheme can dynamically switch between TDMA (Time Division Multiple Access) and SCPC (Single Carrier Per Channel) depending on the amount of traffic within a cell 160. TDMA divides each frequency channel into three time slots to increase the amount of data that is communicated; whereas in SCPC transmissions are sent on a single satellite carrier frequency. Thus, SCPC is large carrier signal and has a large bandwidth (e.g., 200 Mb/s), whereas TDMA is a small carrier with a smaller bandwidth (e.g., about 52 Kb/s). Accordingly, the satellite communication system 5 can dynamically switch between TDMA and SCPC transmissions on-demand, e.g., based on the actual or expected amount of data traffic at a particular cell 160. Thus, for example if there are active user equipment with high amounts of data being communicated, the system uses LTE and SCPC transmission protocols. If there are active user equipment but with low amounts of data being communicated, the system uses LTE and TDMA transmission protocols.

In addition, all of the active user equipment in a cell 160 conduct handover from one baseband unit to the next, to reduce baseband utilization. When a user equipment is outside the field of view 150, it needs to communicate with two baseband units, one for the descending satellite communication system and one for the ascending satellite communication system. When the user equipment is inside the field of view 150, it only needs a single baseband unit.

In another embodiment of the present disclosure, the BBUs can be shared amongst multiple cells 53. FIG. 1 shows a cell's eNodeB 12(A) with two RF ports 12A(1) and 12A(2) delivers the DL and UL LTE signals through two GW antennas 14A and 14 B that serve two satellites 20A and 20 B, each baseband unit (BBU) of a cell providing a beam signal for HO service link 16h/17h via feeder link 14/15 for two TRx path to the two RF ports 12A(1) and 12A(2) on the eNodeB 3 BBU 12(A).

Accordingly, the satellite 100 (e.g., micron 130 or antenna elements) communicates with processing devices on Earth, such as for example a user device (e.g., user equipment such as a cell phone, tablet, computer) and/or a ground station. The present disclosure also includes the method of utilizing the satellite 100 to communicate with processing devices on Earth (i.e., transmit and/or receive signals to and/or from). The present disclosure also includes the method of processing devices on Earth communicating with the satellite 100 (i.e., transmit and/or receive signals to and/or from). In addition, while the satellite 100 is used in Low Earth Orbit (LEO) in the examples disclosed, it can be utilized in other orbits or for other applications. Still further, while the system has been described as for an array of antenna assemblies, the system can be utilized for other applications, such as for example data centers, telescopes, reflectors, and other structures, both implemented in space or terrestrially.

As noted above, the microns 130 and/or the control satellite 110 and/or a ground station (such as an eNodeB) can include a processing device 136, 111 to perform various functions and operations in accordance with the present disclosure. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the present disclosure can be stored on or read from the storage device. The processing device can execute software that can be stored on the storage device. Unless indicated otherwise, the process is preferably implemented in automatically by the processor substantially in real time without delay.

In one embodiment, the operations described above are implemented at the base station processing device (eNodeB) 12, including for example the on-demand multi-RAN, on-demand bandwidth and power, the BBU pool, BBU monitor and control, on-demand carrier aggregation. In other embodiments, the operations are implemented at the control satellite 110 by the control satellite processing device 111.

One advantage of the present system 5 is that the user equipment need not be modified. Accordingly, the system 5 can be utilized with standard user equipment, as all the operation is controlled by the eNodeB 12.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings. Numerous applications will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A processing system, comprising:
memory configured to store resource data for a satellite communication system that has a plurality of satellites each configured to communicate with user equipment within corresponding fields of view on Earth, the resource data corresponding to at least one of power or bandwidth for operation of the satellite communication system; and
a processing device operatively coupled to the memory, the processing device having one or more processors configured to provide on-demand resource allocation for at least one of a threshold bandwidth or a threshold power to the user equipment in the field of view for a given one of the plurality of satellites, in which the one or more processors are configured to determine an expected capacity of a set of cells within the field of view of the given satellite and to cause the given satellite to dynamically switch between different communication protocols according to an amount of communication traffic within the set of cells.

2. The processing system of claim 1, wherein the resource data indicates how much data is being used for all cells within the fields of view of the plurality of satellites.

3. The processing system of claim 1, wherein the resource data includes a set of demand statistics.

4. The processing system of claim 3, wherein the one or more processors are further configured to determine a set of operating parameters for communication between the given satellite and a particular user equipment in one of the set of cells according to the set of demand statistics.

5. The processing system of claim 1, wherein the one or more processors are configured to cause the given satellite to dynamically switch between the different communication protocols in order to switch from a first communication protocol having a first power level to a second communication protocol having a second power level higher than the first power level upon determination that at least a threshold number of user equipment are active within a particular cell of the set of cells.

6. The processing system of claim 1, wherein the one or more processors are configured to cause the given satellite to dynamically switch between the different communication protocols in order to switch from a first communication protocol having a first power level to a second communication protocol having a second power level higher than the first power level upon determination that there is more than a threshold amount of data communication within a particular cell of the set of cells.

7. The processing system of claim 1, wherein the one or more processors are configured to cause the given satellite to dynamically switch between the different communication protocols in order to switch from a first communication protocol having a first power level to a second communication protocol having a second power level lower than the first power level upon determination that fewer than a threshold number of user equipment are active within a particular cell of the set of cells.

8. The processing system of claim 1, wherein the one or more processors are configured to cause the given satellite to dynamically switch between the different communication protocols in order to switch from a first communication protocol having a first power level to a second communication protocol having a second power level lower than the first power level upon determination that there is less than a threshold amount of data communication within a particular cell of the set of cells.

9. The processing system of claim 1, wherein a first one of the different communication protocols is a time division multiple access (TDMA) protocol and a second one of the different communication protocols is a single carrier per channel (SCPC) protocol.

10. The processing system of claim 1, wherein a first one of the different communication protocols is a time division multiple access (TDMA) protocol and a second one of the different communication protocols is a long term evolution (LTE) protocol.

11. The processing system of claim 1, wherein a first one of the different communication protocols is a global system for mobile communications (GSM) protocol and a second one of the different communication protocols is a long term evolution (LTE) protocol.

12. The processing system of claim 1, wherein the one or more processors are configured to determine the expected capacity of the set of cells within the field of view of the given satellite based on a location of the user equipment.

13. The processing system of claim 12, wherein the location of the user equipment is on a plane.

14. The processing system of claim 12, wherein the location of the user equipment is on a boat.

15. The processing system of claim 1, wherein:
the memory corresponds to a network control center database; and
the processing device corresponds to one of a base transceiver station (BTS), an evolved node B (eNodeB), or a next generation node B (gNodeB).

16. A method, comprising:
storing resource data, in memory of a satellite communication system that has a plurality of satellites each configured to communicate with user equipment within corresponding fields of view on Earth, the resource data corresponding to at least one of power or bandwidth for operation of the satellite communication system;
providing, by one or more processors of a processing device, on-demand resource allocation for at least one of a threshold bandwidth or a threshold power to the user equipment in the field of view for a given one of the plurality of satellites, including:
determining an expected capacity of a set of cells within the field of view of the given satellite; and
causing the given satellite to dynamically switch between different communication protocols according to an amount of communication traffic within the set of cells.

17. The method of claim 16, wherein the resource data includes a set of demand statistics, and the method further comprises determining, by the one or more processors, a set of operating parameters for communication between the given satellite and a particular user equipment in one of the set of cells according to the set of demand statistics.

18. The method of claim 16, wherein providing the on-demand resource allocation includes:
determining either (i) that at least a threshold number of user equipment are active within a particular cell of the set of cells, or (ii) there is more than a threshold amount of data communication within the particular cell; and
in response to determining either (i) or (ii), dynamically switching between the different communication protocols in order to switch from a first communication protocol having a first power level to a second communication protocol having a second power level higher than the first power level.

19. The method of claim 16, wherein providing the on-demand resource allocation includes:
determining either (i) that fewer than a threshold number of user equipment are active within a particular cell of the set of cells, or (ii) that there is less than a threshold amount of data communication within the particular cell; and
in response to determining either (i) or (ii), causing the given satellite to dynamically switch between the different communication protocols in order to switch from a first communication protocol having a first power level to a second communication protocol having a second power level lower than the first power level.

20. The method of claim 16, further comprising determining the expected capacity of the set of cells within the field of view of the given satellite based on a location of the user equipment that is either on a plane or on a boat.

* * * * *